United States Patent
Hsu et al.

(10) Patent No.: US 6,956,726 B2
(45) Date of Patent: Oct. 18, 2005

(54) POWER PROTECTION DEVICE

(75) Inventors: Chia-Chang Hsu, Hsinchu (TW); Yen-John Chen, Changhua (TW)

(73) Assignee: Prolific Technology Inc., Taipei (TW)

( * ) Notice: Subject to any disclaimer, the term of this patent is extended or adjusted under 35 U.S.C. 154(b) by 311 days.

(21) Appl. No.: 10/310,951

(22) Filed: Dec. 6, 2002

(65) Prior Publication Data

US 2003/0107855 A1 Jun. 12, 2003

(51) Int. Cl.$^7$ .............................................. H02H 3/00
(52) U.S. Cl. ...................................................... 361/42
(58) Field of Search ............................ 361/42, 56, 58, 361/88, 93.1, 111, 117, 118, 18, 44, 62, 96

(56) References Cited

U.S. PATENT DOCUMENTS 3,786,311 A * 1/1974 Hobson et al. ............... 361/44
4,060,844 A * 11/1977 Davis et al. .................. 361/96
4,266,259 A * 5/1981 Howell ......................... 361/97
4,347,541 A * 8/1982 Chen et al. ................... 361/50
4,589,052 A * 5/1986 Dougherty .................... 361/94
5,428,494 A * 6/1995 Ahuja .......................... 361/62
5,444,590 A * 8/1995 LeComte et al. ............. 361/18
6,288,883 B1 * 9/2001 Chen ............................ 361/58
6,577,478 B2 * 6/2003 Kim et al. .................... 361/42

* cited by examiner

Primary Examiner—Stephen W Jackson
Assistant Examiner—James A Demakis
(74) Attorney, Agent, or Firm—Rabin & Berdo, P.C.

(57) ABSTRACT

A power protection device includes a power source switching unit for shutting off the power supply from an AC power source according to an open control signal, a surge voltage protecting unit for outputting the open control signal when a surge voltage occurs, a leakage current protecting unit for outputting the open control signal when a leakage current occurs, and an over-current protecting unit for outputting an open control signal according to a current value when an over-current occurs. The power protection device provides the surge voltage protection, the leakage current protection and the over current protection at the same time.

8 Claims, 2 Drawing Sheets

POWER PROTECTION DEVICE

This application incorporates by reference of Taiwan application Serial No. 090130266, filed Dec. 6, 2001.

BACKGROUND OF THE INVENTION

1. Field of the Invention

This invention relates in general to a power protection device. More specifically, the present invention relates to a power protection device capable of preventing over-current, leakage current and surge current at the same time.

2. Description of Related Art

As the technology is developed far beyond our imagination, people count on electrical appliances more and more. For example, computers, washing machines, micro-ovens, air-conditioners, and refrigerators, etc., bring great convenience for people and increase their living quality. However, as the amount of the electricity used increases, the danger also increases. Generally, abnormal electrical phenomena include over-current, leakage current and a surge. Over-current means that the total current used for the appliances is too large for the power lines. The leakage current often occurs in a high humidity environment, such as the bathroom, so that the current flows through the human body to cause an electric shock. For example, a current over 8 mA generally causes an electric shock. A surge means that a high voltage occurs suddenly and temporally, which causes the appliances to be damaged. Conventionally, different power protection devices corresponding to respective abnormal phenomena of the power source are individually developed. For example, some extension outlets have a surge protection device with a fuse to prevent the appliance from being damaged. In addition, regarding the over-current protection, a fuse, a mechanical over-current switch, or a device using a detector circuit are provided. However, the conventional power protection device can only provide one function to solve one of the aforementioned problems. To prevent the different abnormal phenomena, a plurality of protection devices with different functions have to be purchased, so that the purchase cost increases and the difficulty for building the power protection system also increases.

SUMMARY OF THE INVENTION

According to the foregoing description, an object of this invention is to provide a power protection device capable of preventing over-current, leakage current and surges at the same time.

According to the object(s) mentioned above, the present invention provides a power protection device. The power protection device comprises a power source switching unit, a surge voltage protector, a leakage protection unit and an over-current protection unit. The power source switching unit is coupled to an alternating current (AC) power source, for shutting down the supply of the AC power source based on an open control signal. The surge voltage protection unit is coupled to the AC power source and the power source switching unit, for preventing the surge voltage. When the surge voltage protection unit detects the voltage of the AC power source is larger than a surge voltage threshold, the surge voltage protection unit outputs an open control signal. The leakage protection unit is coupled to the AC power source and the power source switching unit, for preventing leakage current at the AC power source. The leakage protection unit receives a current difference between the hot line and the ground line and compares the current difference with a leakage current threshold. If the current difference between the hot line and the ground line is larger than the leakage current threshold, the open control signal is outputted. The over-current protection unit is coupled to the AC power source and the power source switching unit, for preventing an over-current at the AC power source. The over-current protection unit outputs the open control signal according to the current value or the energy output from the AC power source.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1:
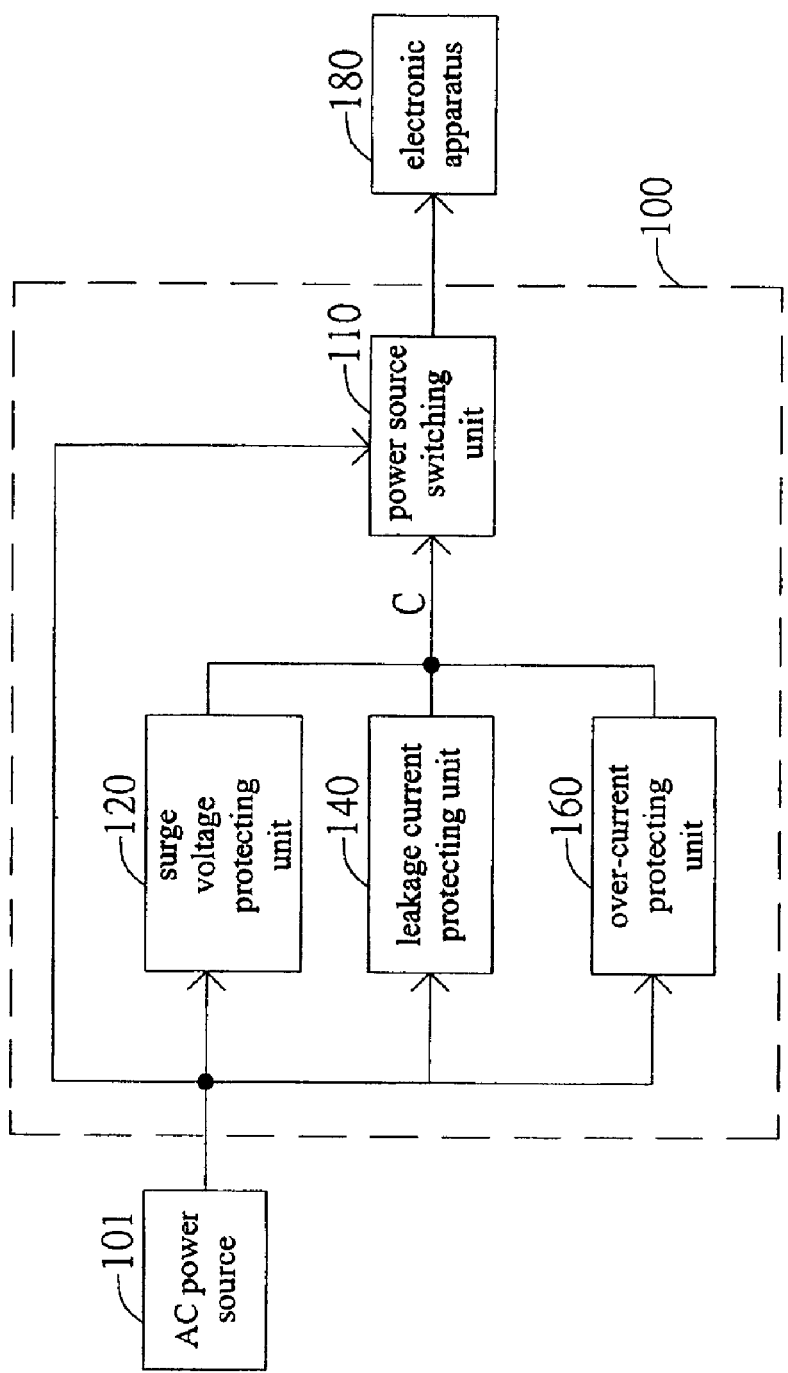
FIG. 1 is a block diagram of a power protection device according to one preferred embodiment of the present invention.

FIG. 1 is a block diagram of a power protection device according to one preferred embodiment of the present invention. Referring to FIG. 1, the power protection device 100 is coupled to an AC power source 101 and an electronic apparatus 180 for shutting off the AC power source 101 to protect the electronic apparatus 180 when an abnormal power supply occurs. The power protection device 100 comprises a power source switching unit 110, a surge voltage protecting unit 120, a leakage current protecting unit 140, and an over-current protecting unit 160. The power source switching unit 110 is coupled to the AC power source 101. When the power source switching unit 110 receives an open control signal C, the power source switching unit 110 is switched off and the AC power source 101 is disconnected from the electronic apparatus 180. That is, the power supply of the AC power source 101 is shut off and no power is supplied to the electronic apparatus 180.

The surge voltage protecting unit 120 is coupled to the AC power source 101 to prevent the surge voltage from damaging the electronic apparatus 180. The surge voltage protecting unit 120 is further coupled to the power source switching unit 110 to detect the voltage of the AC power source 101. After comparing the voltage of the AC power source 101 with a surge voltage threshold Sth, the open control signal C is outputted when the voltage of the AC power source 101 is greater than the surge voltage threshold Sth.

The leakage current protecting unit 140 is coupled to the AC power source 101 and the power source switching unit 110 to prevent the leakage current at the AC power source 101. The leakage current protecting unit 140 receives the current flowing through a hot line F and a ground line G. If the difference between the value of the current flowing through the hot line F and the ground line G is greater than a leakage current threshold Lth, the open control signal C is outputted.

The over-current protecting unit 100 is coupled to the AC power source 101 and the power source switching unit 110. When over currents generated from the AC power source 101, the open control signal C is outputted.

Figure 2:
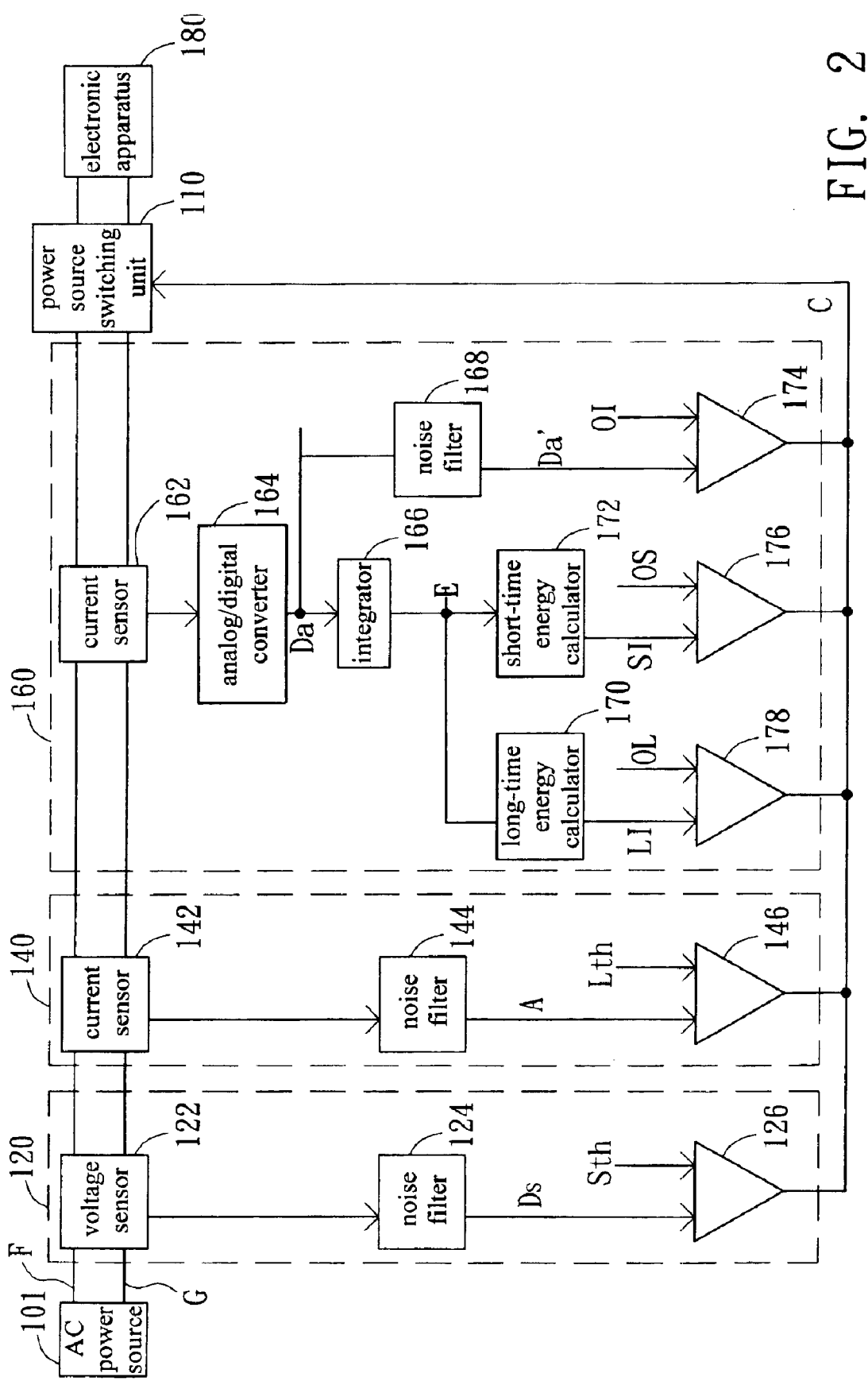
FIG. 2 is a detail block diagram of the power protection device.

FIG. 2 is a detail block diagram of the power protection device 100. The AC power source 101 comprises the hot line F and the ground line G. The surge voltage protecting unit 120 comprises a voltage sensor 122, a noise filter 124, and a surge voltage comparator 126. The voltage sensor 122 is coupled to the AC power source 101 for receiving the voltage of the AC power source 101 which is then passed to the noise filter 124. The noise of the signal indicating the voltage of the AC power source 101 is filtered and is converted to a voltage signal Ds. The surge voltage comparator 126 is used to compare the voltage signal Ds with the surge voltage threshold Sth. If the voltage signal Ds is larger than the surge voltage threshold Sth, the open control signal C is outputted. The surge voltage comparator 126 can be a digital comparator, for example.

The leakage current protecting unit 140 comprises a current sensor 142, a noise filter 144 and a leakage current comparator 146. The current sensor 142 is coupled to the AC power source 101 for receiving the current flowing through the hot line F and the ground line G. Then, the difference between the current values flowing through the hot line F and the ground line G is amplified and transmitted to the noise filter 144. The noise filter 144 filters out the noise and then outputs a leakage current amplifying signal A. The leakage current comparator 146 is coupled to the power source switching unit 10 for comparing the leakage current amplifying signal A with the leakage current threshold Lth. If the leakage current amplifying signal A is larger than the leakage current threshold Lth, the open control signal C is outputted. In general, a human body will be electrically shocked if the current is between 8 mA and 22 mA. Therefore, the leakage current threshold Lth can be set between these values. Besides, the leakage current comparator 146 can be an analog comparator, for example.

The over-current protecting unit 160 comprises an instantly breaking element, a short-time overload control element and a long-time overload control element. For a general wire, such as wire having a current rating of 10A, when the instantly breaking element detects an extremely large current, for example a current larger than 20A, a breaking protection process is immediately executed. The instantly breaking element comprises a current sensor 162, an analog/digital converter 164, a noise filter 168 and a comparator 174. The current sensor 162 is coupled to the AC powers source 101 for receiving the current from the AC power source 101, generating an analog signal indicative of the current value, which is then converted into a digital signal Da by the analog/digital converter 164. The noise filter 168 filters out noise of the digital signal Da and then outputs a digital signal Da' that will be fed into the comparator 174. The comparator 174 compares the digital signal Da' with an instant threshold OI. If the digital signal Da' is larger than the instant threshold OI, the open control signal C is outputted. The instant threshold OI can be set to about 20A, for example.

A current between 10A and 20A might not cause danger instantly, but it does cause danger if the current lasts for a period of time. Overload protections respectively for a short period of time and a long period of time can be used based upon the energy accumulated within a certain time. The tolerance time for a current of 12A is larger than the tolerance time for a current of 18A. Accordingly, when determining whether to shut off the power source, a better protection effect can be achieved by consideration of the accumulated energy released within a certain time. Energy is a measure of power expended over time. In this embodiment, the short-time overload control element and the long-time overload control element are used to calculate respectively the energy released within the short-time interval Ts and the energy released within the long-time interval Tl, and to determine whether an over current has occurred. The time intervals are not limited to the above two time intervals Ts and Tl.

The short-time overload control element comprises the current sensor 162, the analog/digital converter 164, an integrator 166, a short-time energy calculator 172 and a comparator 176. The integrator 166 integrates the digital signal Da squared over an integrating time interval $\Delta t$, so as to output a power level E. The short-time energy calculator 172 receives the power level E to generate a short-time energy SI by accumulating the power level E within a short-time interval Ts. The comparator 176 compares the short-time energy SI with a short-time threshold OS. If the short-time energy SI is larger than the short-time threshold OS, the open control signal C is generated. The short-time interval Ts can be about 3 to 5 seconds, for example, and is longer than the integrating time interval $\Delta t$.

The long-time overload control element comprises the current sensor 162, the analog/digital converter 164, the integrator 166, a long-time energy calculator 170 and a comparator 178. The long-time energy calculator 170 receives the power level E to generate a long-time energy LI by accumulating the power level E within a long-time interval Tl. The comparator 178 is used to compare the long-time energy LI and the long-time threshold OL. If the long-time energy LI is larger than the long-time threshold OL, the open control signal C is outputted. The long-time interval Tl is about 3 to 5 minutes in this embodiment and is longer than the short-time interval Ts and the integrating time interval $\Delta t$. In the present embodiment, the current sensor 162 and the analog/digital converter 164 are shared by the instantly breaking element, the short-time overload control element and the long-time overload control element. The integrator 166 is shared by the short-time overload control element and the long-time overload control element.

Conventionally, in order to provide the surge voltage protection, the leakage current protection and the over-current protection, three different power protection devices have to be provided. However, in the present embodiment, the three protection devices are integrated, so that the size of the protection device can be reduced and the cost is reduced. Furthermore, the over-current protecting unit can determine whether abnormal phenomenon occurs according to the magnitude of the current and the energy consumption within a time interval. Therefore, the power source can be protected in a safer manner.

According to the embodiment described above, the power protection device can provide the surge voltage protection, the leakage current protection and the over-current protection at the same time. In comparison with the conventional structure, the cost is further reduced and the over-current is detected based on the accumulated energy, to provide accurate and safe protection.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A power protection device, coupled to an alternating current (AC) power source having a hot line and a ground line, the power protection device comprising:

a power source switching unit, coupled to the AC power source, for shutting off the AC power source according to an open control signal;

a leakage current protecting unit, coupled to the AC power source and the power source switching unit, for preventing a leakage current, wherein the leakage current protecting unit receives a first current values of a current flowing through the hot line and a second current value of a current flowing through the ground line, compares a difference between the first current value and the second current values with a leakage current threshold, and outputs the open control signal if the difference is greater than the leakage current threshold; and an over-current protecting unit, coupled to the AC power source and the power source switching unit, for preventing an over-current at the AC power source, the over-current protecting unit including a current sensor, coupled to the AC power source, for outputting at least one of the first current value and the second current value of the AC power source, an analog/digital converter, for converting the output of the current sensor into a digital signal, an integrator, calculating a power level by integrating the digital signal squared over an integrating time interval, an short-time energy calculator, for receiving the power level to generate a short-time energy by accumulating the power level within a short time interval, a first comparator, for comparing the long-time energy with an abnormal threshold and outputting the open control signal when the short-time energy is larger than the abnormal threshold, a long-time energy calculator, for receiving the power level to generate a long-time energy by accumulating the power level within a long-time interval, and a second comparator, for comparing the long-time energy with a long-time threshold, and outputting the open control signal when the long-time energy is larger than the long-time threshold, wherein the long-time interval is longer then the short time interval.

2. The power protection device of claim 1, wherein the over-current protecting unit further comprises third comparator, coupled to the analog/digital converter and the power source switching unit, the third comparator outputting the open control signal if the digital signal is larger than an instant threshold.

3. The power protection device of claim 2, wherein the over-current protecting unit further comprises a noise filter for filtering out noises of the digital signal.

4. The power protection device of claim 1, wherein the leakage current protecting unit comprises:

a current sensor, coupled to the AC power source, for outputting the difference between the first current values and the second current value; and a leakage current comparator, for receiving the output of the current sensor, and outputting the open control signal if the difference between the first current value and the second current value is larger than a leakage current threshold.

5. The power protection device of claim 4, wherein the leakage current protecting unit further comprises a noise filter for filtering out noises of the difference outputted from the current sensor.

6. The power protection device of claim 1, further comprising:

a surge voltage protecting unit, coupled to the AC power source and the power source switching unit, for preventing a surge voltage, and wherein the surge voltage protecting unit comprises:

a voltage sensor, for receiving a voltage of the AC power source and then converting the voltage of the AC power source into a voltage signal; and a surge voltage comparator, for receiving the voltage signal and a surge voltage threshold, and outputting the open control signal if the voltage signal is larger than the surge voltage threshold.

7. The power protection device of claim 6, wherein the surge voltage protecting unit further comprises a noise filter for filtering out noises of the voltage signal.

8. The power protection device of claim 1, wherein the short-time interval is longer than the integrating time interval.

* * * * *